(12) United States Patent
Lindgren et al.

(10) Patent No.: US 6,504,853 B1
(45) Date of Patent: Jan. 7, 2003

(54) REALLOCATION PROCEDURE

(75) Inventors: Per Lindgren, Stockholm (SE); Christer Bohm, Stockholm (SE)

(73) Assignee: Net Insight AB, Stockholm (SE)

( * ) Notice: Subject to any disclaimer, the term of this patent is extended or adjusted under 35 U.S.C. 154(b) by 0 days.

(21) Appl. No.: 09/142,873

(22) PCT Filed: Mar. 25, 1997

(86) PCT No.: PCT/SE97/00520

§ 371 (c)(1),
(2), (4) Date: Sep. 16, 1998

(87) PCT Pub. No.: WO97/36402

PCT Pub. Date: Oct. 2, 1997

(30) Foreign Application Priority Data

Mar. 25, 1996 (SE) ................................................ 9601130

(51) Int. Cl.⁷ .................................................. H04J 3/00
(52) U.S. Cl. ........................................ 370/468; 370/458
(58) Field of Search ................................ 455/452, 453, 455/450; 370/321, 329, 337, 347, 442, 468, 458, 437, 439, 443

(56) References Cited

U.S. PATENT DOCUMENTS

| | | | |
|---|---|---|---|
| 4,949,395 A | | 8/1990 | Rydbeck |
| 5,511,110 A | * | 4/1996 | Drucker ........................ 379/57 |
| 5,629,940 A | * | 5/1997 | Gaskill ........................ 370/311 |
| 5,748,624 A | * | 5/1998 | Kondo ........................ 370/347 |
| 5,991,627 A | * | 11/1999 | Honkasalo et al. ......... 455/437 |
| 6,016,311 A | * | 1/2000 | Gilbert et al. .............. 370/280 |

FOREIGN PATENT DOCUMENTS

| | | |
|---|---|---|
| EP | 0477659 A1 | 4/1992 |
| EP | 0726661 A2 | 8/1996 |
| JP | 4-314240 A | 11/1992 |

OTHER PUBLICATIONS

"Fast Circuit Switching for the Next Generation of High Performance Networks", Christer Bohm et al., *IEEE Journal of Selected Areas in Communications,* vol. 14, No. 2, Feb. 1996, pp. 299–300.

"Multi–gigabit Networking Based on DTM", Lars Gauffin et al., *Computer Networks and ISDN Systems,* 24(2), Apr., 1992, pp. 119–130.

\* cited by examiner

*Primary Examiner*—Ken Vanderpuye

(57) ABSTRACT

A technique is provided for allocating access to time slots used for transferring data between nodes in a time multiplexed network, whose bandwidth is divided into cycles. The cycles are in turn divided into control slots for control signaling and data slots for transferring data. The slots allocated to a primary home node may be temporarily allocated to a temporary home node, in which case the temporary home node, instead of the primary home node, then temporarily has the write access to the slots. The slots may subsequently be reallocated to the primary home node. In particular, the degree of temporary allocation of slots to a first node is evaluated. Then, the number of slots having the first node as a primary home node may be increased based upon the evaluation. This decreases the need for temporary allocation of slots within the network.

2 Claims, 4 Drawing Sheets

Number of blocks assigned as home

Number of blocks assigned as home

REALLOCATION PROCEDURE

TECHNICAL FIELD OF INVENTION

The present invention relates to methods, a controller and a system for allocating access to time slots used for transferring data between nodes in a time multiplexed network, such as a Dynamic Synchronous Transfer Mode (DTM) network, whose bandwidth is divided into cycles which in turn are divided into control slots for control signalling and data slots for transferring data, wherein slots allocated to a primary home node may be temporarily allocated to a temporary home node, said temporary home node instead of said primary home node then temporarily having the write access to said slots, and subsequently reallocated to said primary home node.

DESCRIPTION OF RELATED ART

As an example of a time multiplexed network, DTM is a broadband network architecture (see e.g., Christer Bohm, Per Lindgren, Lars Ramfelt, and Peter Sjödin, The DTM Gigabit Network, Journal of High Speed Networks, 3(2), pp 109–126, 1994 and Lars Gauffin, Lars Håkansson, and Björn Pehrson, Multi-gigabit networking based on DTM, Computer Networks and ISDN Systems, 24(2), pp 119–139, April 1992). DTM is a circuit switched network and intended to be used in public networks as well as in local area networks (LAN's). It uses channels as the communication abstraction. The channels differ from telephony circuits in various ways. First, establishment delay is short so that resources can be allocated/reallocated dynamically as fast as user requirements change. Second, they are simplex and so minimise overhead when the communication is unidirectional. Third, they offer multiple bit-rates to support large variations in user capacity requirements. Finally, they are multicast, allowing several destinations.

DTM channels share many beneficial properties with circuits. There is no transfer of control information after channel establishment, resulting in very high utilisation of network resources for large data transfers. Support of real-time traffic is natural; there is no need for policing, congestion control or flow-control within the network. The control information is separated from data, which makes multicast less complex. The transmission delay is negligible (i.e., less than 125 ms) and there is no potential for data loss because of buffer overflow as in ATM (Asynchronous Transfer Mode). Bit-error rates depend on the underlying link technologies, and switches are simple and fast due to strict reservation of resources at channel set-up. DTM can show good performance in areas where traditional circuit-switched networks fall short: dynamic bandwidth allocation, channel establishment delay, and as shared media networks.

The basic topology of a DTM network is preferably a bus with two unidirectional optical fibers connecting all nodes, but can also be realised by any other kind of structure, e.g., a ring structure. The DTM medium access protocol is a time-division multiplexing scheme. The bandwidth of the bus is divided into 125 $\mu$s cycles, which in turn are divided into 64-bit time slots. The number of slots in a cycle thus depends on the network's bit-rate. The slots are divided into two groups, control slots and data slots. Control slots are generally static and used to carry messages for the network's internal operation. The data slots are used to transfer user data between the nodes.

Generally, in each network node there is a node controller, which controls the access to data slots and performs network management operations.

Control slots are used exclusively for control messages between these node controllers. Each node controller preferably has write access to at least one control slot in each cycle, which it uses to multicast control messages to other node controllers. Here, multicast refers to sending information to one or more downstream nodes on a bus, as the transmission medium is unidirectional. Since write access to control slots is exclusive, the node controller always has access to its control slots regardless of other nodes and network load.

The majority of the slots in a cycle are data slots. Access to data slots changes over time, according to traffic demands. Write access to slots is controlled by slot access, sometimes referred to as slot tocens. A node controller may write data into a specific slot only if the node has write access to this specific slot. The slot access protocol, or token protocol, guarantees the slot access to be conflict free, which means that several nodes do not write data into the same slot.

One optimisation in slot access management is to introduce so called block access or block tokens, i.e. access to a number of slots arranged contiguously in a slot range. A block token, i.e. access to a group of slots, may be transferred in a single control message, but can only be used for particular combinations of slots. For instance, block access may be denoted by a slot number and an offset giving the number of contiguous slots in the group or block.

Also, write access to slots (single or block) may be exchanged or varied between different nodes during network operation, for example as a result of a node asking for more transferring capacity by requesting write access to more slots from other nodes. One of the major problems with this kind of write access allocation is fragmentation. The average number of contiguous available time slots allocated to a node of a DTM-like network is small due to the random movement and exchange of slot access and the varying capacity of users' requests. This gives relatively long access delays (in the millisecond region) for high capacity channels, particularly at moderate to high load.

One way of dealing with this fragmentation problem is to define a home node for each slot at network start-up or during network operation. This is preferably done in such a way that slots having the same home node preferably define at least partly a continuous slot range. The nodes may then "borrow" available or free slots from each other, sending back free slots to their respective home node, for example when a significant time has passed. Also, two or more consecutive slots are preferably merged into a single block token when existing in the free pool of a node.

Hence, in a DTM-like system of this kind, a first node may have write access to a first set of slots and a second node may have write access to a second set of slots. Then, the first node is said to be the primary home node of the first set of slots and the second node is said to be the primary home node for the second set of slots. However, if the first node at some time require more transferring capacity to fulfil the demands of one or more users attached to the first node, it may temporarily lend or borrow slots from another node, for example the second node, presently having a surplus of slots. In such a case, one or more slots having the second node as primary home node may be temporarily allocated to the first node, the first node then being a so called temporary home node of said one or more borrowed slots and hence temporarily having the write access thereto. When the demand for transferring capacity in the first node decreases, or for example after a predefined time interval or, said one or more borrowed slots are returned to their primary or actual home node, i.e. the second node.

However, nodes in, e.g., an integrated services network will have different load depending on the equipment attached to it. Also, the load will vary in time. In case of non-uniform traffic, a node that requires high capacity may have to regularly borrow slots from and return slots to their respective home node, which results in overhead for slot negotiation and longer set-up times for the channels.

SUMMARY OF THE INVENTION

The object of the invention is to avoid the problems mentioned above with overhead for slot access negotiation in a time multiplexed network, such as a Dynamic Synchronous Transfer Mode (DTM) network, whose bandwidth is divided into cycles, which in turn are divided into time slots comprising control slots for control signalling and data slots for transferring data.

According to the invention, this and other objects are achieved by a method, a controller and a system having the features presented in the accompanying claims.

Hence, according to one aspect, the invention is preferably provided in a network wherein slots allocated to a primary home node may be temporarily allocated to a temporary home node, said temporary home node instead of said primary home node then temporarily having the write access to said slots, and subsequently reallocated to said primary home node.

According to the invention, the degree of temporary allocation of slots to a first node is evaluated and, based upon this evaluation, the number of slots having said first node as primary home node is increased in response thereto in order to decrease the need for temporary allocation of slots within said network.

Preferably, the transfer of slot ownership is initiated by a request from the node having a lack of slot capacity. Such a request, or any other type of reallocation initiation, may for example be provided when the node has borrowed slots a predifined number of times, when the ratio between the number of slots having the node as temporary home node and the number of slots having the node as primary home node exceeds a predefined value, when the allocation or "loan" has to be directed over a substantial distance over the network. As another alternative, a predefined fraction or a predefined number of slots may be arranged to change owner, i.e. primary home node, each time one node borrows slots from another as a result of the loan itself.

Hence, according to the invention slots may be reallocated to new home nodes during network operation. In one embodiment, a first node sends a request to a second node to get more slots assigned to it as primary home node and the second node transfers slots to the first node so that the slot capacity assigned to the first node as primary home node is increased and the slot capacity assigned to the second node as primary home node is decreased. Preferably, the allocation is done in such a way that the tokens that will share the same primary home node will define at least partly a continuous slot range.

Preferably, slots having the same primary home node define a continuous slot range. Then, all nodes assigned as primary home nodes for slots located, in a cycle, in-between slots having a first node as primary home node and slots having a second node as primary home node may transfer slot write access in the following way.

The second node is assigned as present node. Write access to a number of slots, amounting to the number requested by the first node, having the present node as primary home node and neighbouring a slot range having a next node as primary home node are reallocated from the present node to the next node, said slot range of the next node either being the slot range of the first node or being a slot range of a node located in between the slot ranges of the first and the second nodes. The distance between the slot range of the next node and the slot range of the first node is preferably smaller than the distance between the slot range of the present node and the slot range of the first node. In case of the next node not being the first node, the next node is assigned as the present node and the step of reallocating is repeated. This procedure is referred to as a "push", since write access to the requested number of slots is pushed from the second node to a next node to another next node and so on, until it has been pushed to the first node.

According to the invention, the problems mentioned above are avoided by efficiently reallocating slot access to new primary home nodes, so minimising overhead for slot access negotiation. The criteria for when a node should request more slots assigned to it as primary home node, which node it should ask and how much capacity it should request, can be chosen in various ways, as mentioned above and below. However, resilience has to be implemented in order to avoid oscillation and thus overhead for control signalling.

Preferably, but not necessarily, each node has a node controller, which controls the write access to slots and in which a home node is defined for each slot and free slots may be sent back to their respective home nodes when a significant time has passed.

An advantage of the invention is that it is a simple and easily implemented mechanism, which strongly improves the performance of the network. The probability of that a node has to temporarily borrow slots from another node is decreased.

A further advantage of the invention is that low fragmentation is maintained.

Yet another advantage is that the reallocation of a slot to a new home node may be realised even though the slot is in use, e.g., by another node temporarily having access to the node, i.e. being the temporary home node of said slot.

Still another advantage of the invention is that it, especially in combination with a slot reuse method, may further improve the bandwidth utilisation.

BRIEF DESCRIPTION OF THE DRAWINGS

Exemplifying embodiments of the invention will be described in greater detail below with reference to appended drawings, in which.

DETAILED DESCRIPTION OF PREFERRED EMBODIMENTS

Figure 1:
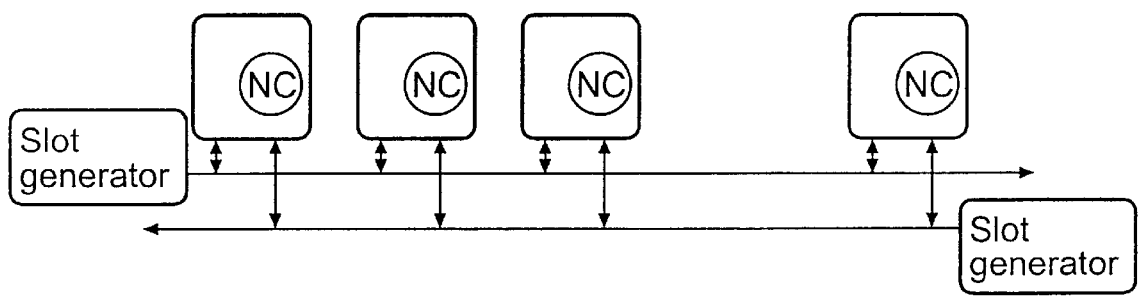
FIG. 1 shows a dual-bus DTM network.

First, as an example of a time multiplexed network, the DTM MAC (Medium Access Control) protocol will be described with reference to FIGS. 1 and 2. The basic topology of a DTM-like network is a bus with two unidirectional optical fibers connecting all nodes Node 0, Node 1, ..., Node N−1, as shown in FIG. 1. Several buses with different speeds may be connected to form an arbitrary multistage network. In the current prototype implementation, buses can be combined into a two-dimensional mesh. A node at the junction of two buses can synchronously switch data slots between the two buses. This allows for efficient switching with constant delay through the node. The primary communication abstraction in DTM is a multirate, multicast channel.

A DTM medium access protocol is a time-division multiplexing scheme. The bandwidth of the bus is divided into 125 μs cycles, which in turn are divided into 64-bit time slots (or slots for short) as illustrated in FIG. 2. The number of slots in a cycle thus depends on the network's bit-rate; for instance, on a 6.4 Gbit/s network there are approximately 12500 slots per cycle.

Figure 2:
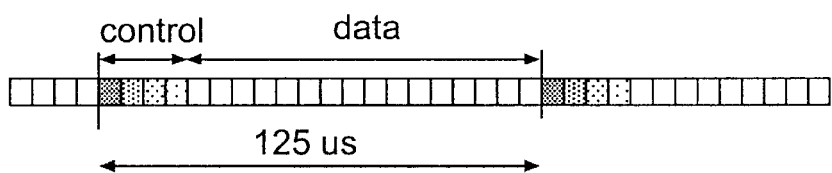
FIG. 2 shows a DTM 125 $\mu$s cycle that is divided into data slots and control slots.

As shown in FIG. 2, the slots are further divided into two groups, control slots and data slots. Control slots are used to carry messages for the network's internal operation, such as messages for channel establishment and bandwidth reallocation. The data slots are used to transfer user data and are not necessarily read by intermediate network nodes, i.e. nodes arranged between the source node and the destination node or nodes.

Generally, but not necessarily, in each network node there is a node controller NC, which controls the access to data slots and performs network management operations, such as network start-up and error recovery. The main tasks of the node controller NC are to create and terminate channels on demand from users and to manage network resources in response to user requests and in the background.

Control slots are used exclusively for messages between node controllers NC. Each node controller NC preferably has write permission to at least one control slot in each cycle, which it uses to broadcast control messages downstream to other nodes. Since write access to control slots is exclusive, the node controller NC has always access to its control slots regardless of other nodes and network load. The number of control slots a node uses may vary during network operation.

The network is not restricted to a dual-bus, as exemplified in FIG. 2, but can be realised by other kind of structures, e.g., a ring structure with an arbitrary number of nodes. The transmission media can besides to optical fibers be coaxial cables or any other high bandwidth transmission media. The bandwidth of the DTM dual bus in the preferred embodiment is divided into 125 μs cycles, which in turn are divided into 64-bit time slots. The invention is of course not restricted to time multiplexed networks with these values, but can be used in networks with cycles and slots of arbitrary sizes.

Principles for resource management (called slot access of token management) will be described below. The majority of the slots in a cycle are data slots. Access to data slots changes over time, according to traffic demands. Write access to slots is controlled by so called slot access. A node controller NC may write data into a slot only if the node has write access thereto. The token or write access protocol guarantees the slot access to be conflict free, which means that several nodes do not write data into the same slot. The write access to slots are controlled by the node controllers and it may be transferred from a node controller to another via control messages. In the following the write access protocol may also be refereed to as the token protocol.

Control messages for channel establishment and bandwidth reallocation contains set of slots or tokens as parameters. However, a control message is 64 bits and can therefore have only a small number of parameters. This means that if a user requests a large bandwidth transfer, it may be necessary to send several control messages to create the channel. This introduces extra access delay and consumes control signalling capacity.

Several mechanisms to decrease the amount of information that needs to be sent during channel creation and slot reallocation are considered. The first optimisation in token management is to introduce so called block tokens or slot range access. Access to a slot range may be transferred in a single control message and represents access to a group of slots, i.e. a group of slot tokens, but can only be used for particular combinations of slot access. For instance, block token may be denoted by a slot number and an offset giving the number of contiguous slots in the group or block.

In a basic form, the slot access protocol guarantees that a data slot can never be used by two nodes simultaneously on the bus, which sometimes may be too conservative. Nodes are connected by bus segments. Channels typically use a subset of the segments on the bus, and the rest are reserved but left unused and thus wasting shared resources. A better alternative is to let channels only reserve capacity on the segments between the sender node and the receiver node or nodes, as exemplified in FIG. 3. A single slot may in this case be used multiple times on the bus. For example, channel D and E are using the same slots as channel A and C but on different segments. This is referred to as slot reuse. Slot reuse enables simultaneous transmissions in the same slot over disjointed segments of the bus. To allow slot reuse in a DTM-like network, the slot access format is extended to include parameters describing the segment(s) it is representing. The slot access management protocol is also modified to avoid conflicts in the slot number dimension as well as in the segment dimension.

A distributed slot access manager will be described in the following. Each node regularly broadcasts status information about how many free slots or slot ranges it has and how large they are. The other nodes store this information in their status tables. A node that wants more capacity consults its status table to decide from which node to request slots. The broadcast state information gives an approximate and dated view of the current state of slot information, so slot requests may be rejected because they were sent to nodes that no longer have free slots to give away.

The protocol on the initiating side may for example work as follows when a user request arrives to a node:

1. If the node has sufficiently many free slots to satisfy the request, it allocates the requested amount of slots to the user, and starts the channel by sending a channel establishment message to the destination node and then transmitting data using the reserved slots.

2. Otherwise the node marks its available slots as being reserved, and then preferably, but not necessarily, checks its status table: if the total amount of free slots in the network is not enough to fulfil the request, then the request is rejected (blocked). Otherwise the node requests slots from nodes with unused capacity.

3. If one of these nodes receiving a slot request does not have the requested amount of free slots, it may still gives away all the slots it has. In any case, it sends a response back to the requesting node. A node preferably, but not necessarily, fulfils incoming requests in strict first-in-first-out order.

4. When a node receives a response to a slot request, it marks the slots it receives in the response (if any) as being reserved. When the node has received responses to all requests it has sent, it either starts the channels or rejects the user request, depending on whether or not it has acquired sufficient capacity. If the user request is rejected, the reserved slots are marked as free again.

At start-up all free slots may be evenly distributed among the network nodes, and each node may preferably then take at least one of its free tokens, move it (them) to the active state and declares it (them) to be a control slot. User requests may then be accepted and slot access can be moved between nodes on demand.

The pool of free slots may be distributed in other ways than evenly, e.g., proportionally (nodes upstream get more slots than nodes downstream) among all nodes.

In the general case, the average number of contiguous free slots in a node is small due to the random movement of slots and the varying capacity of users' requests. This fragmentation renders the block token optimisation practically useless, and the access delay is relatively long (milliseconds) for high capacity channels. To make block allocation efficient, it is necessary to reduce fragmentation of free slots or slot ranges, otherwise fragmentation will be by far the main contributor to access delay for high bandwidth channels at moderate to high load. Low capacity channels will usually have a very short channel establishment delay independent of the current amount of fragmentation.

Figure 3:
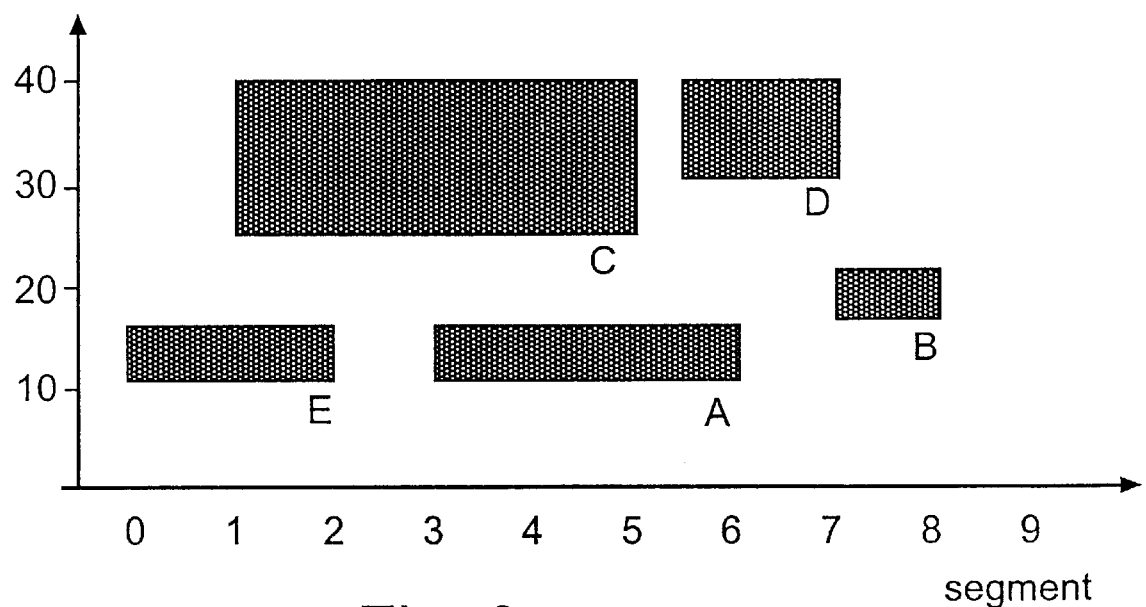
FIG. 3 shows different block slot access or block tokens in a slot-segment map.

In the case of slot reuse, the fragmentation problem is even worse, as fragmentation may occur in both slot (time) and segment (space) dimensions (see FIG. 3). In the distributed slot access manager system, most of the fragmentation is a result of using many free pools (one for each node). Two free adjacent tokens, i.e. slots or slot ranges, can only merge if they are found in the same node.

An example of a distributed scheme that tries to avoid fragmentation if possible and increases the average block size of free slots belonging to a node works as follows:

1. A home node is defined for each slot or slot range at network start-up, and the slots are distributed in such a way so slots having the same primary home node will always define at least partly a continuous slot range. This results in a large average slot access area or token area in the token map shown in FIG. 3.

2. When two consecutive slots or slot ranges having the same slot or segment range exist in the free pool, they are merged into a single token, i.e. a single slot range access (sometimes a recursive split and merge operation is needed). When performing a merge, a segment merge is prioritised before a slot number merge. (The reason for this is that slot access spanning over just a few segments are less useful to other nodes than slot access spanning over many segments.) Two segment-consecutive slots representing at least partly the same slot range and existing in the free pool of a node are split to obtain segment-consecutive slot access, representing the same slot range, which are merged into a single token.

3. When a node gets a slot access request from the local user or a remote user, slots is picked from the free slot pool, preferably, but not necessarily, using a best-fit algorithm in slot number and segment number dimension (see FIG. 3). The "value of a token" is calculated as the area of a token in the token map and the token with the smallest area that fulfil the requested capacity is picked. A cost function can also be defined as a function of, e.g., number of slots, number of segments, location of slots and location of segments, which function should be minimised, however, still fulfilling the requested capacity.

4. When a node needs to request slots from other nodes, it does not ask for small chunks from several nodes if it is possible to ask for larger chunks from fewer nodes. The status tables provide this information. Transfer of slot access is therefore more efficient, and there are fewer establishment messages and less fragmentation.

5. Free slots are sent back to primary home nodes when they have been idle for a significant time or after a long transfer or after having been used a certain number of times or the like.

This scheme returns slots to their respective primary home nodes as a way to increase the probability that two consecutive slot or slot ranges can be merged in the free list, which decreases fragmentation. If the slots are returned to their respective primary home nodes too soon, i.e., if the home node "gravity" is too strong, the scheme will result in less sharing of resources and unnecessary control signalling. If it is too weak, fragmentation will still remain a problem. The "gravity" may be changed during the operation of the bus.

However, nodes in, e.g., an integrated services network will have different load depending on the equipment attached to it. Also, the load will vary in time. In case of non-uniform traffic, a node that requires high capacity may have to regularly return slots to their respective home nodes, which results in overhead for slot access negotiation and longer set-up times for the channels.

To avoid this, a new mechanism which defines new home nodes for slots during network operation, is introduced:

According to an exemplifying embodiment of the invention, a first node sends a request to a second node to get more slots assigned to it as primary home node and the second node transfers slots to the first node as new primary home node so that the slot capacity assigned to the first node as primary home node is increased and the slot capacity assigned to the second node as primary home node is decreased. Preferably this is done in such a way that the slots that will have the same primary home node will define at least partly a continuous slot range.

The invention avoids the problems with overhead for slot access negotiation by efficiently reallocate slots to new home nodes. Using the invention, low fragmentation is maintained. It is desirable to be able to define new primary home nodes for slots even though they are in use, i.e. even though they are currently allocated to some other node as temporary home node.

Preferably, slots sharing the same primary home node define a continuous slot range. Then, all nodes assigned as primary home nodes to slots located, in a cycle, in-between slots having the first node as home node and slots having the second node as home node may for example transfer slot access in the following way:

1. The second node is assigned as present node.

2. Access to a number of slots, amounting to the number requested by the first node, having the present node as home node and neighbouring a slot range having a next node as home node are reallocated from the present node to the next node, said slot range of the next node either being the slot range of the first node or being a slot range of a node located in between the slot ranges of the first and the second nodes and the distance between the slot range of the next node and the slot range of the first node preferably being smaller than the distance between the slot range of the present node and the slot range of the first node.

3. In case of the next node not being the first node, the next node is assigned as the present node and the step 2 of reallocating is repeated.

This procedure is referred to as push.

Figure 4:
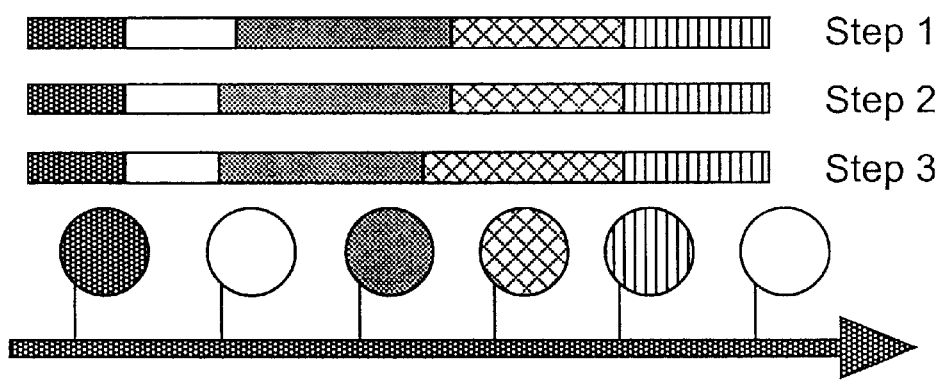
FIG. 4 shows how new home nodes are defined for slots in consecutive steps according to the invention.

To explain this procedure in detail, an example is given with reference to FIG. 4. Suppose there are six nodes connected to a bus as shown in FIG. 4. To each node is assigned a set of consecutive slots in such a way that the first slot range within the cycle is assigned to node 1 as home node, the second slot range within the cycle is assigned to node 2 as home and so on, as indicated in Step 1 of FIG. 4.

Suppose now that node 4 has determined or evaluated that it often requests or borrows many slots and thus permanently needs more. It then requests, e.g., node 2 to transfer a number of slots in a slot range. The node to be requested can be chosen in several ways, as will be discussed below.

Node 2 now chooses a portion of its slots, which corresponds to a set of consecutive slots closest to the slot range assigned to node 3 as home node, and transfers it to node 3. Consequently, node 3 increases the size of the slot range assigned to it as home node, as shown in Step 2 of FIG. 4.

Node 3 repeats this procedure and thus transfers a portion of its slot range, which is of the same size as the one received but corresponds to consecutive slots closest to the slot range assigned to node 4 as home node, to node 4. Now, the size of the slot range assigned to node 4 as home is increased, as indicated in Step 3 of FIG. 4.

This method avoids fragmentation of the slot pools, since consecutive slots will be assigned to each node as home. Slot range access, or block tokens, which shall change home node, are in this manner "pushed" through the nodes between the two negotiating nodes (Steps 1–3), thereof the name of the procedure.

With this configuration (node 1 is assigned as home to the first slot range, node 2 is assigned as home to the second slot range etc.) it is possible to implement a simple procedure for sending free slots, which may have been in use during the reallocation, to their respective new home nodes.

After the allocation, each home node has information about the slots assigned to it as home node. According to the simple procedure for sending free slots to their respective new home nodes, the node that uses the slot or slot range sends it back from where it got it when it does not need it any more. This because the node may not know the new home node after the reallocation. The node that receives the slot checks if the slot still is assigned to it as home node. If not, the node checks whether the slot or slot range corresponds to slot number(s) lower or higher than the slots corresponding to the slot range now assigned to it as home. If it corresponds to lower slot number(s), the slot or slot range access is sent to the node's closest neighbour with node number lower than its own, and if it corresponds to higher slot number(s), the slot or slot range access is sent to the node's closest neighbour with node number higher than its own. The next node that receives the slot or slot range access repeats the procedure until the slots are returned to its new home node. In this way, also returning slots are pushed through the nodes from the old home node to the new home node.

Using this simple procedure, the change of home node does not affect the use of the slots at that time. Since control messages are multicast in for example DTM, the intermediate nodes can observe when nodes borrow slots. In this way the push procedure may be implemented in such a way that the intermediate nodes automatically perform the reallocations of new home nodes.

Which point in time a node should request more slots assigned to it as home may be decided every time the node requests or borrows slots from other nodes. To avoid oscillation, resilience has to be included, e.g., by requesting a home node change only every n'th time a node requests or borrows slots from other nodes or for example by only reallocating a certain part of the slots borrwed. Another technique that may be used is to correlate the node's borrowed slots to its owned. If, e.g., the quotient of borrowed slots, i.e. slots having the node as temporary home node, and owned slots, i.e. slots having the node as primary home node, exceeds a predetermined value, a home node reallocation is initiated.

From which node a home node movement shall be requested may be determined for example by using one or more of the following methods.

In the first method, the node requests the node which at the time has most free slots (capacity). This is easily found by referring to its status table, where information about the free capacity in each node is stored.

In the second method, the node maintains a record of nodes from which it has borrowed slots, e.g., most recently or during a predetermined period. It then requests a change of home node from the node it has, according to the record, borrowed most slot capacity from.

How many slots or how large slot range a node should request to be assigned to it as home may be chosen as a fraction of the slot capacity the node requests or borrows from other nodes. It may be implemented as the value at the time for reallocation or as a mean value by referring to the record of loans. Alternatively, the quotient of borrowed slots and owned slots may be used. It may also be set as a fixed amount of slots or may be controlled by management operations.

In some situations, the procedures may be utilised more efficiently on the DTM bus when combined with a slot reuse method as to be described in the following. When the first node sends a request to the second node to get more slots assigned to it as home node, it requests slot access corresponding only to predetermined segments of the network. The second node transfers slot access corresponding only to these segments to the first node, letting slot access, which correspond to the same slots but on different segments, be unchanged. This increases fragmentation, but will in some situations be advantageous.

Results from simulations performed, with the ownership reallocation and push mechanisms included, will be described in the following. In the simulations, reallocation of resources in the background to adapt to non-uniform traffic, is evaluated. The frame size is chosen to be 2400 slots, which corresponds to a communication link capacity of approximately 1.2 Gbit/s. For lower communication link capacity less processing and control signal capacity for each node are required. Thus, it is possible to simulate smaller transfers without trashing phenomena, i.e., very low throughput at high offered loads due to lack of signal capacity. Small transfers are used to more clearly observe the difference when including the push mechanism. The traffic in each node is exponentially distributed and a few nodes are designed as hot-spots, i.e., they have much more traffic in the simulations.

Figure 5:
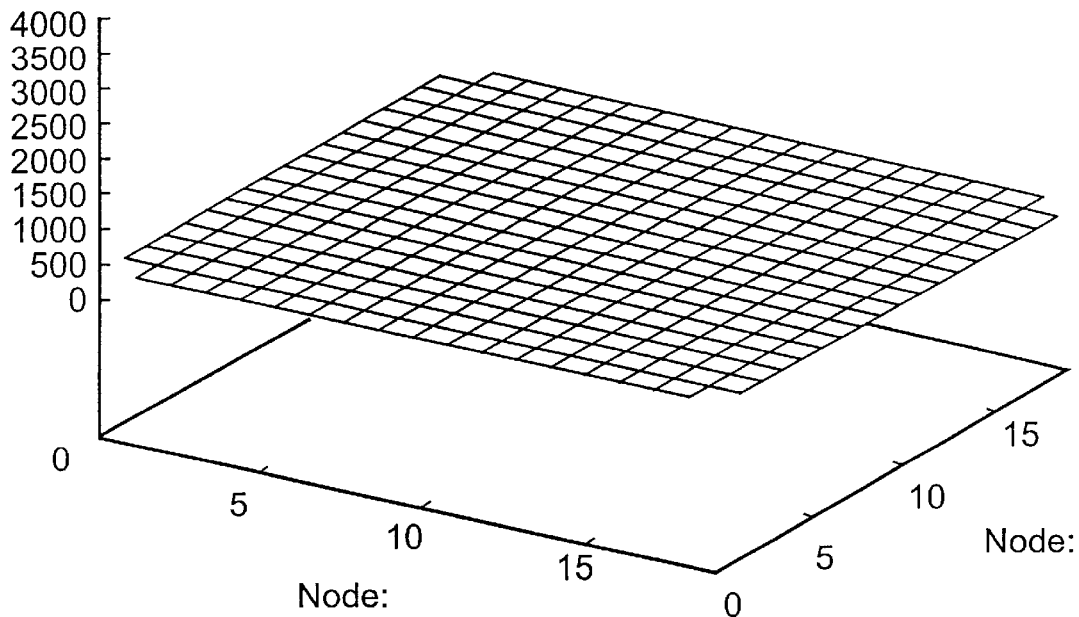
FIGS. 5–8 show results from simulations where the ownership reallocation and push mechanisms are included.
Figure 6:
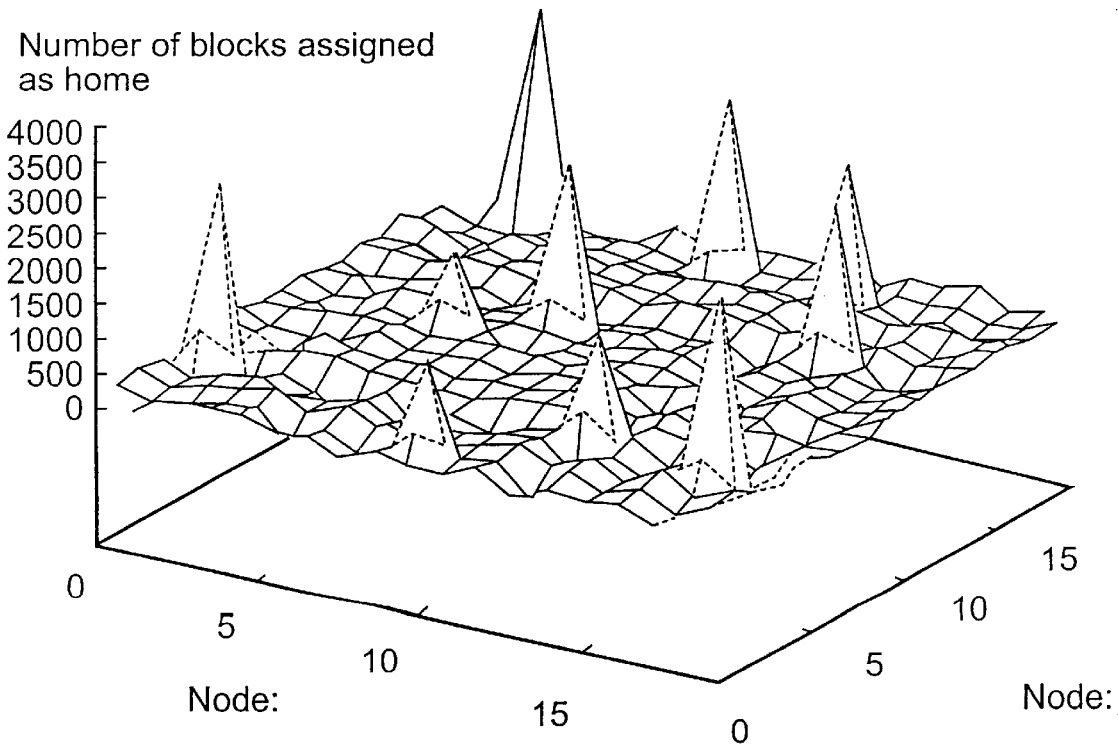

Initially, the home node assignment is evenly distributed among the nodes as can be seen in FIG. 5. The change of home node is executed when a node has received a number of requests for more capacity from another node. Then it "pushes" write access to one slot through the intermediate nodes to the requesting node. In the simulations this is done for every 10'th request, which introduces inertia in the system. This is important since the push mechanism and ownership reallocation mechanism shall cope with long term variations in load. The state at approximately 100 ms is shown in FIG. 6. During the operation of the network, the home node is changed according to the load, i.e., the hot-spots will have more slots assigned to them as home.

Figure 7:
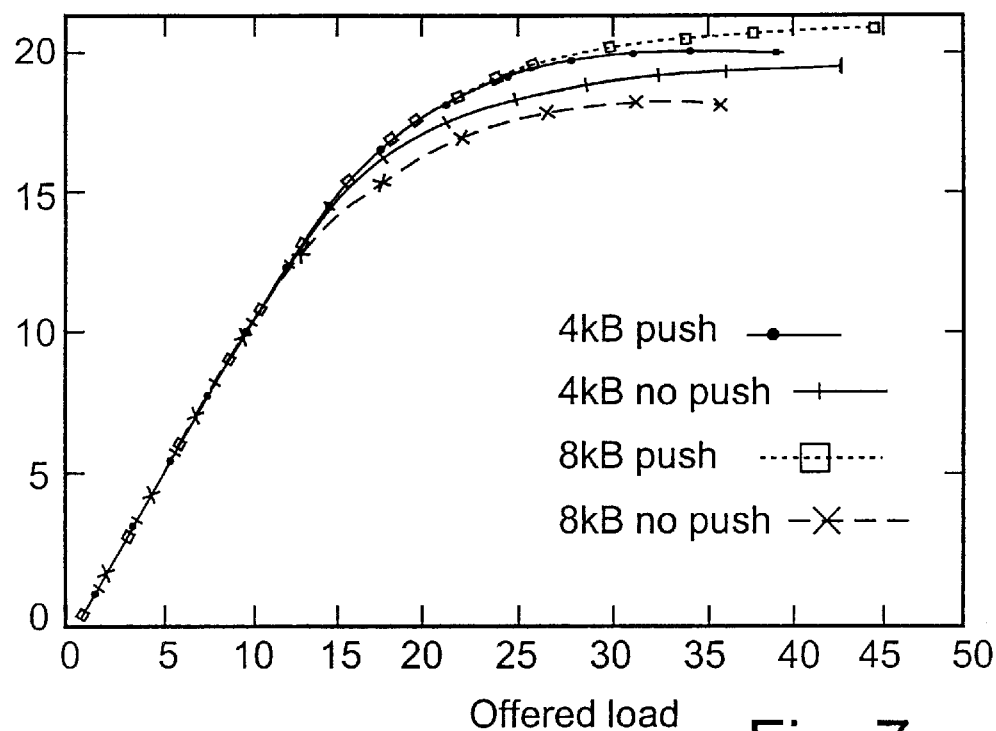
Figure 8:
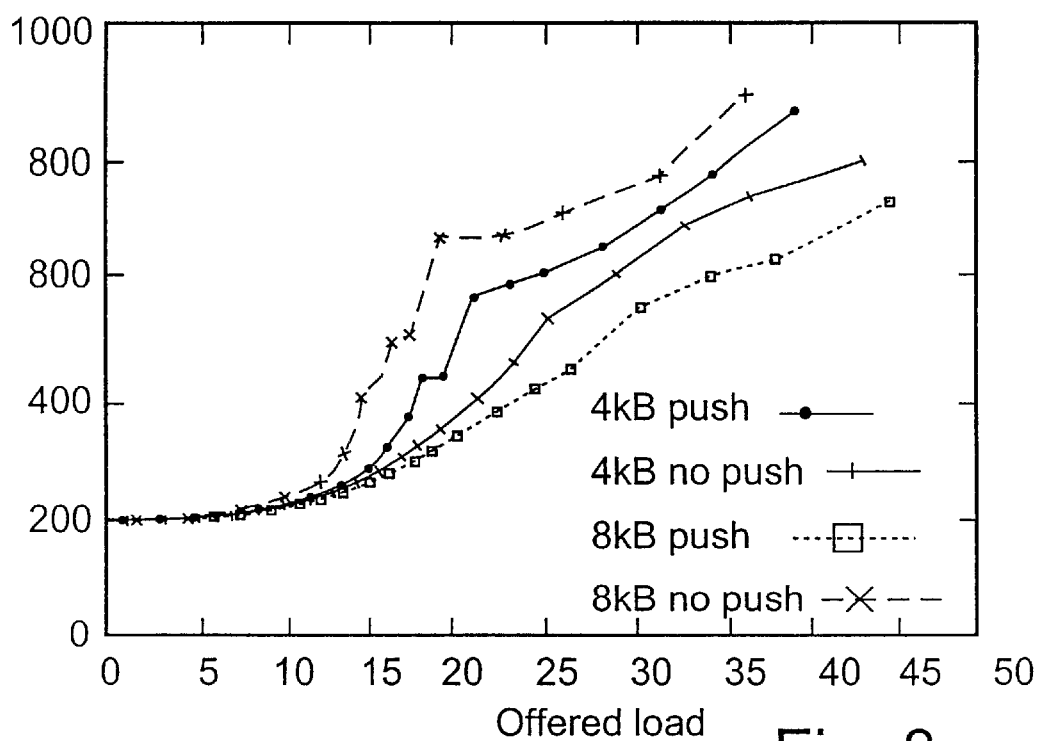

The ownership allocation mechanism will reduce the amount of reallocations of slots for, e.g., client/server like traffic. In FIG. 7 is shown the throughput and in FIG. 8 the channel set-up time as a function of offered load with and without the ownership allocation and push mechanisms. Results are presented for transfers of 4 kB and 8 kB. It can be observed that the throughput is significantly higher with the ownership allocation and push mechanisms. Also, the channel set-up time is lower. This is the case since the hot-spots do not need to return slots to other nodes as frequently as with an evenly distributed home node assignment.

According to the invention, there is provided efficient reallocation of slot access to new home nodes, so minimising overhead for slot access negotiation. The criteria for when a node should request more slots assigned to it as home node, which node it should ask and how much capacity it should request, can be chosen in various ways, e.g., as described above. Requests of these types may also origin from the equipment attached to the node. It is possible to, e.g., manually initiate the reallocation and decide how many slots that are to be reallocated. Also, the allocation of slots may be controlled by a network controller controlling the allocation of slots to one or more nodes, such as a master node controlling the allocation of slots to a slave node. However, resilience has to be implemented in order to avoid oscillation and thus overhead for control signalling.

The procedures and mechanisms according to the invention are simple and easily implemented. The performance of the time multiplexed network is strongly improved and the fragmentation is maintained low. Also, the reallocation of a slot to a new home node may be realised even though the slot is in use.

As is understood by those skilled in the art, different variations and modifications of the invention may be made without departing from the scope of the invention, which is defined by the accompanying claims.

What is claimed is:

1. A method for allocating access to time slots used for transferring data between nodes in a time multiplexed network, whose bandwidth is divided into cycles which in turn are divided into control slots for control signalling and data slots for transferring data, wherein a first node has write access to a first slot or slot range, comprising the steps of:

determining an increased demand for transferring capacity in the first node;

allocating an extra slot or slot range to the first node from another node in such a way that said extra slot or slot range are contiguous with said first slot or slot range as a result of said increased demand, wherein the allocating of a number of slots in a slot range from a second node to the first node comprises designating the second node as present node;

allocating said number of slots from the present node to a next node having access to a neighbouring slot or slot range; and designating said next node as the present node and repeating the step of allocating said number of slots from the present node to a next node until said number of slots have been allocated to the first node.

2. A method for allocating access to time slots used for transferring data between nodes in a time multiplexed network, whose bandwidth is divided into cycles which in turn are divided into control slots for control signalling and data slots for transferring data, comprising allocating, when determining a need for transferring bandwidth capacity from a second node being assigned a second slot range to a first node being assigned a first slot range, an extra slot range to the first node from the second node in such a way that said extra slot range becomes contiguous with the first slot range by the steps of:

allocating a number of consecutive slots of the second slot range, said consecutive slots being positioned closest to a neighbour slot range neighbouring the second slot range in the slot direction toward the first slot range, from the second node to the node that said neighbour slot range is assigned to; and allocating, for each intermediate slot range between the second slot range and the first slot range, access to a number of consecutive slots of the intermediate slot range, said consecutive slots being positioned closest to a neighbour slot range neighbouring the intermediate slot range in the slot direction towards the first slot range, from the node being assigned the intermediate slot range to the node being assigned the neighbour slot range.

* * * * *